(12) United States Patent
Saville et al.

(10) Patent No.: US 6,401,155 B1
(45) Date of Patent: Jun. 4, 2002

(54) INTERRUPT/SOFTWARE-CONTROLLED THREAD PROCESSING

(75) Inventors: Winthrop L. Saville, Soquel; Kevin Ross, Sunnyvale, both of CA (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/273,938

(22) Filed: Mar. 22, 1999

Related U.S. Application Data

(63) Continuation-in-part of application No. 09/218,551, filed on Dec. 22, 1998.

(51) Int. Cl.[7] .................................................. G06F 9/48
(52) U.S. Cl. ...................................... 710/266; 709/108
(58) Field of Search ................................ 710/260, 266, 710/268, 269; 709/108

(56) References Cited

U.S. PATENT DOCUMENTS

| | | |
|---|---|---|
| 4,074,353 A | 2/1978 | Woods et al. |
| 4,410,939 A | 10/1983 | Kawakami |
| 5,142,677 A | 8/1992 | Ehlig et al. |
| 5,349,680 A | 9/1994 | Fukuoka |
| 5,353,418 A | 10/1994 | Nikhil et al. |
| 5,428,779 A | 6/1995 | Allegrucci et al. |
| 5,550,993 A | 8/1996 | Ehlig et al. |
| 5,659,749 A | 8/1997 | Mitchell et al. |
| 5,696,957 A | 12/1997 | Yamaura et al. |
| 5,742,782 A | 4/1998 | Ito et al. |
| 5,742,822 A | 4/1998 | Motomura |
| 5,799,188 A * | 8/1998 | Manikundalam et al. ... 709/108 |
| 5,944,816 A * | 8/1999 | Dutton et al. ............... 710/266 |
| 6,061,710 A * | 5/2000 | Eickemeyer et al. ........ 710/260 |

FOREIGN PATENT DOCUMENTS

| | | | |
|---|---|---|---|
| EP | 0134386 A2 | 3/1985 | ............. G06F/9/44 |
| EP | 0565849 A2 | 10/1993 | ............. G06F/9/44 |
| WO | WO9203783 | 3/1992 | ............. G06F/9/46 |

* cited by examiner

*Primary Examiner*—Glenn A. Auve

(57) ABSTRACT

Rapid thread processing is achieved by transferring complete thread contexts between a memory and a context register set. Each thread context is read from a respective memory location in response to either a designated interrupt or an instruction.

31 Claims, 3 Drawing Sheets

|     |               | I | II | III | IV |
|-----|---------------|---|----|-----|----|
| $t_0$ |              |   |    |     |    |
| $t_1$ | EXT 2        | B |    |     |    |
| $t_2$ | INT 1        | B | F  |     |    |
| $t_3$ | EXT 1        | B | F  | A   |    |
| $t_4$ | SWITCH TO P0 TC | B | G | A  |    |
| $t_5$ | EXT 3        | B | G  | A   | C  |

FIG. 3

|     |               | I | II | III | IV |
|-----|---------------|---|----|-----|----|
| $t_0$ |              |   |    |     |    |
| $t_1$ | EXT 2        | B |    |     |    |
| $t_2$ | INT 1        | B | F  |     |    |
| $t_3$ | EXT 1        | B | F  | A   |    |
| $t_4$ | SWITCH TO P0 TC | B | G | A  |    |
| $t_5$ | EXT 3        | B | G  | A   | C  |
| $t_6$ | EXT 4        | D | G  | A   | C  |

FIG. 4

INTERRUPT/SOFTWARE-CONTROLLED THREAD PROCESSING

This application is a continuation in part of Ser. No. 09/218551, filed Dec. 22, 1998.

BACKGROUND OF THE INVENTION

1. Field of the Invention

The invention relates to thread-oriented processing and, in particular, to multiple-thread processing by the use of contexts.

2. Description of Related Art

In multiple-thread processing, a processor is capable of successively running a plurality of different processes (commonly referred to as "threads"). Upon the occurrence of a particular event, such as after the elapse of a predetermined time period or upon the receipt of a specific instruction, the processor suspends running of one thread, stores a context describing the status of the thread being suspended, and begins running another thread, which is also described by a respective context. Each "context" contains information needed for the processor either to initiate running of a new thread or to continue operation of a suspended thread. Typically this information includes memory addresses, status information and data.

In order to provide direct and rapid access to stored thread contexts, some processors include multiple banks of local context registers. This, however, is an inflexible arrangement which limits to a fixed quantity the number of threads that can be run. It is also inefficient whenever the number of threads is smaller than the number of register banks provided.

Alternatively, the multiple contexts can be stored in a separate memory. Various examples of such an approach are described in U.S. Pat. No. 5,349,680. In one of these examples, described in the patent as a conventional information processing apparatus, a main processor includes both an application supporting unit for successively executing operations from different application processes and a system supporting unit for controlling the operation in the information processing apparatus. The efficiency of this arrangement is described as inferior, because the application supporting unit and the system supporting unit are never operated at the same time. U.S. Pat. No. 5,349,680 proposes alternative arrangements utilizing multiple stored contexts, but each of these arrangements requires the use of two separate processors. This is an expensive way to improve efficiency.

SUMMARY OF THE INVENTION

It is an object of the invention to enable rapid and efficient multiple-thread processing by a single processor that does not suffer from the inflexibility of utilizing a fixed number of local context registers.

This and other objects are achieved by swapping contexts between a context register set and a memory. This enables rapid multiple-thread processing with a minimum of hardware. In accordance with the invention, a method is employed which includes:

associating each of the interrupts with a respective memory location;

storing in the memory locations a plurality of respective thread context pointers, each of the pointers identifying a memory location for containing a thread context fully describing the operational status of one of the threads;

in response to the occurrence of any of the interrupts, reading the pointer from the respective memory location associated with the interrupt;

from the memory location identified by the thread context pointer, reading the respective thread context into the context register set; and running the thread described by the thread context read.

By storing in memory locations associated with respective interrupts not contexts themselves, but pointers to contexts, the interrupts are de-referenced from specific contexts. This provides a high degree of versatility in determining responses to interrupts. It also enables memory to be conserved by storing in only one memory location a context which is common to more than one interrupt and by including the address of this common context in each of the pointers for these interrupts. Further, by storing contexts themselves directly in the memory locations identified by the pointers, rapid processor changes from one thread to another are made possible.

Note that the word "memory", as used herein, is intended to be interpreted as generally as is consistent with the manner in which it is used and includes, without limitation, volatile and non-volatile devices of various types, such as registers, RAMs, DRAMs, ROMs, and combinations of such devices. Additionally, "reading" means retrieving information from one memory and writing it into another.

In a particularly advantageous embodiment of the invention, certain instructions in a program stream (i.e. the instruction sequence that forms the program) being executed by the processor directly effect context changes in the processor. This enables rapid context changes to be initiated by the threads themselves.

BRIEF DESCRIPTION OF THE DRAWING

FIG. 3 is a diagram illustrating operation of the multiple-thread processing system of FIG. 1 with prioritized threads.

FIG. 4 is a diagram illustrating operation of the multiple-thread processing system of FIG. 1 with first and second levels of priorities.

DESCRIPTION OF THE PREFERRED EMBODIMENTS

Figure 1:
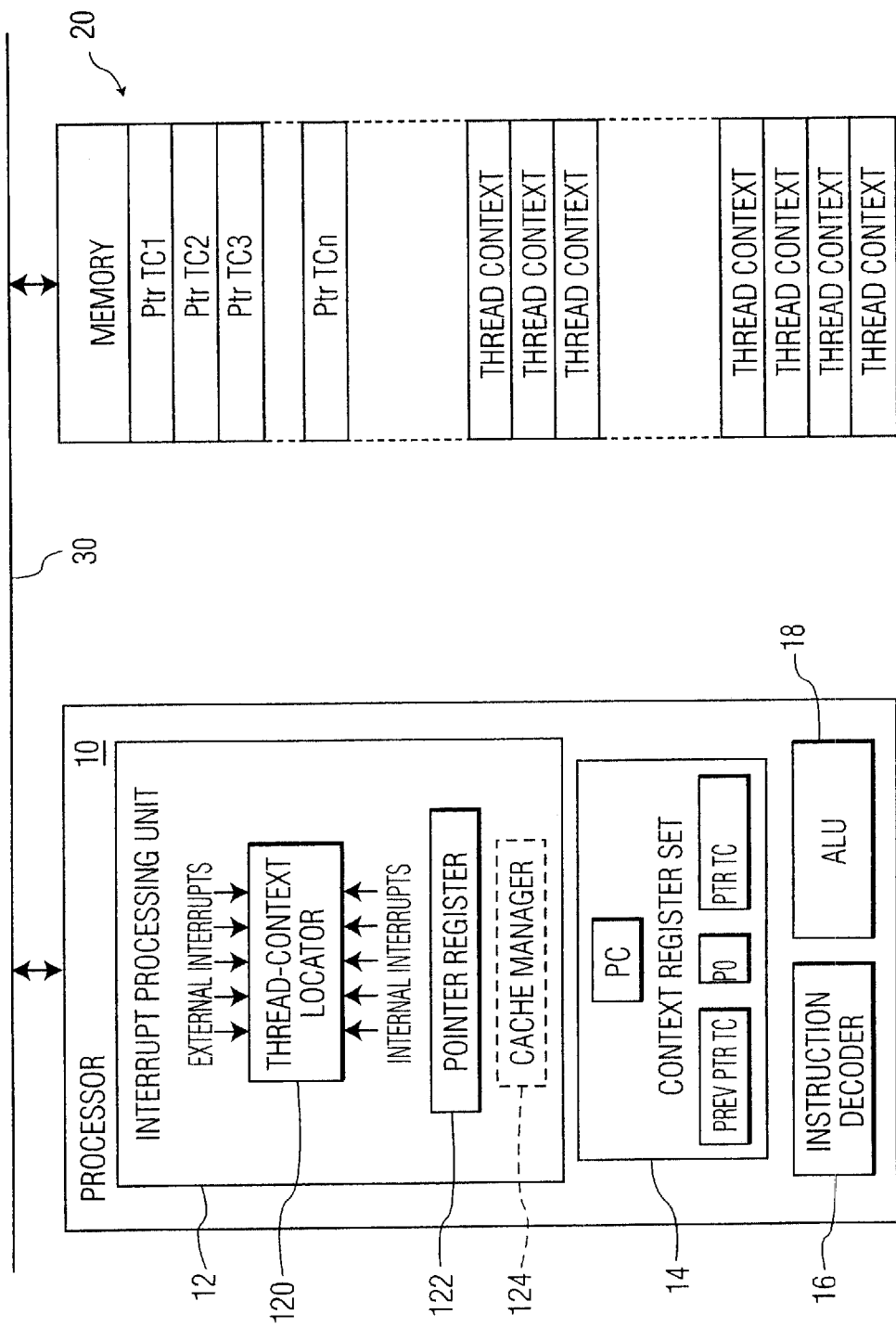
FIG. 1 is a diagram which generally illustrates operation of a multiple-thread processing system in accordance with an embodiment of the invention.

The multiple-thread processing system of FIG. 1 includes a single processor 10 and a memory 20. The exemplary processor 10 is a hardware-accelerated unit which utilizes clock pulses to sequence through instructions identified by a program counter register. Typically, the program counter register contains the memory location of the next instruction to be read and acted upon by the processor.

The processor includes an interrupt processing unit 12, a context register set 14, an instruction decoder 16 and an arithmetic logic unit 18. The memory 20, in this exemplary embodiment, comprises a RAM having a multiplicity of memory locations for storing, inter alia, a plurality of thread context pointers PtrTC1, PtrTC2, PtrTC3, . . . PtrTCn, and a plurality of thread contexts.

The processor 10 and the memory 20 are connected to a common bus 30 for communicating with each other and with other hardware that is connected to the bus. The bus includes respective lines for carrying information such as addresses, interrupts, data, read strobes, write strobes and device-select strobes. Preferably, this is a high-speed bus which is at least partially formed on a common silicon substrate with the processor and the memory.

Operation of the processor 10 is controlled entirely by interrupts and by instructions in the program stream. The interrupts may be either external interrupts received from the bus 30 or internal interrupts generated within the processor itself, e.g., from a timer (not shown) in the processor. Each of the external interrupts is associated with a predetermined location in the memory 20 where one of the thread context pointers PtrTC1, PtrTC2, PtrTC3, . . . PtrTCn is stored. Each of these pointers is associated with one of the thread contexts that is utilized by hardware connected to the bus 30 and identifies the memory location where the specific context is stored. Note that more than one of the pointers (e.g. PtrTC1 and PtrTC3) may be associated with (i.e. "share") the same thread context and, thus, identify the same memory location. This is useful if, for example, more than one apparatus connected to the bus 30, e.g. a receive FIFO and a transmit FIFO, utilize the same context. Each of the internal interrupts is associated with a predetermined location in the memory 20 where one of the thread contexts utilized by the processor is stored.

If a context is shared, the processing time is longer, because the interrupt service thread must determine the source of the interrupt. However, less memory is needed. Conversely, if an interrupt makes exclusive use of a context, the interrupt service thread can inherently identify the source of the interrupt and the processing response time is shorter. This provides a system architect with flexibility.

All of the interrupts are processed by the interrupt processing unit 12, which includes a thread context locator 120, a pointer register 122 and, optionally, a cache manager 124. The thread context locator 120 produces addresses identifying the memory locations that are associated with the external and internal interrupts. In response to any interrupt, the thread context locator produces an address identifying the predetermined location in the memory 20 where the associated one of the thread context pointers PtrTC1, PtrTC2, PtrTC3, . . . PtrTCn is stored. The processor then reads the thread context location from this memory location into the pointer register 122. Examples of external interrupts include FIFO TRANSMIT COMPLETE, FIFO DATA RECEIVED, DMA TRANSFER COMPLETE, FIFO TRANSMIT FAILURE etc. Examples of internal interrupts include internal timers etc.

Preferably the thread-context locator comprises a dedicated priority-sensitive hardware component for producing the addresses, such as a programmable look-up table or an encoder, both of which are well known in the art. This both maximizes addressing speed and enables processing of higher priority interrupts before lower priority interrupts.

The context register set 14 comprises a plurality of registers for containing the context of the thread currently being run by the processor 10. In the preferred embodiment, the register set 14 includes:

a register PTR TC for storing the memory address of the context for the thread currently being run the processor;

a register PREV PTR TC for storing the memory address of the context for the thread previously run by the processor;

a register P0 which is used for identifying the locations of thread contexts that may not be identified by the thread context pointers stored in the memory 20;

a program counter register PC which continually updates to identify the address of the next instruction in the memory 20 to be accessed;

one or more general purpose registers (not shown); and one or more data registers (not shown) for containing data which is either read from the memory 20 or produced by the arithmetic logic unit 18.

The instruction decoder 16 is a conventional hardware component, such as a sequencer or micro-sequencer, for converting the instructions read from the memory 20 to lower-level operation codes to be executed by the arithmetic logic unit 18. The arithmetic logic unit is also a conventional hardware component.

Figure 2:
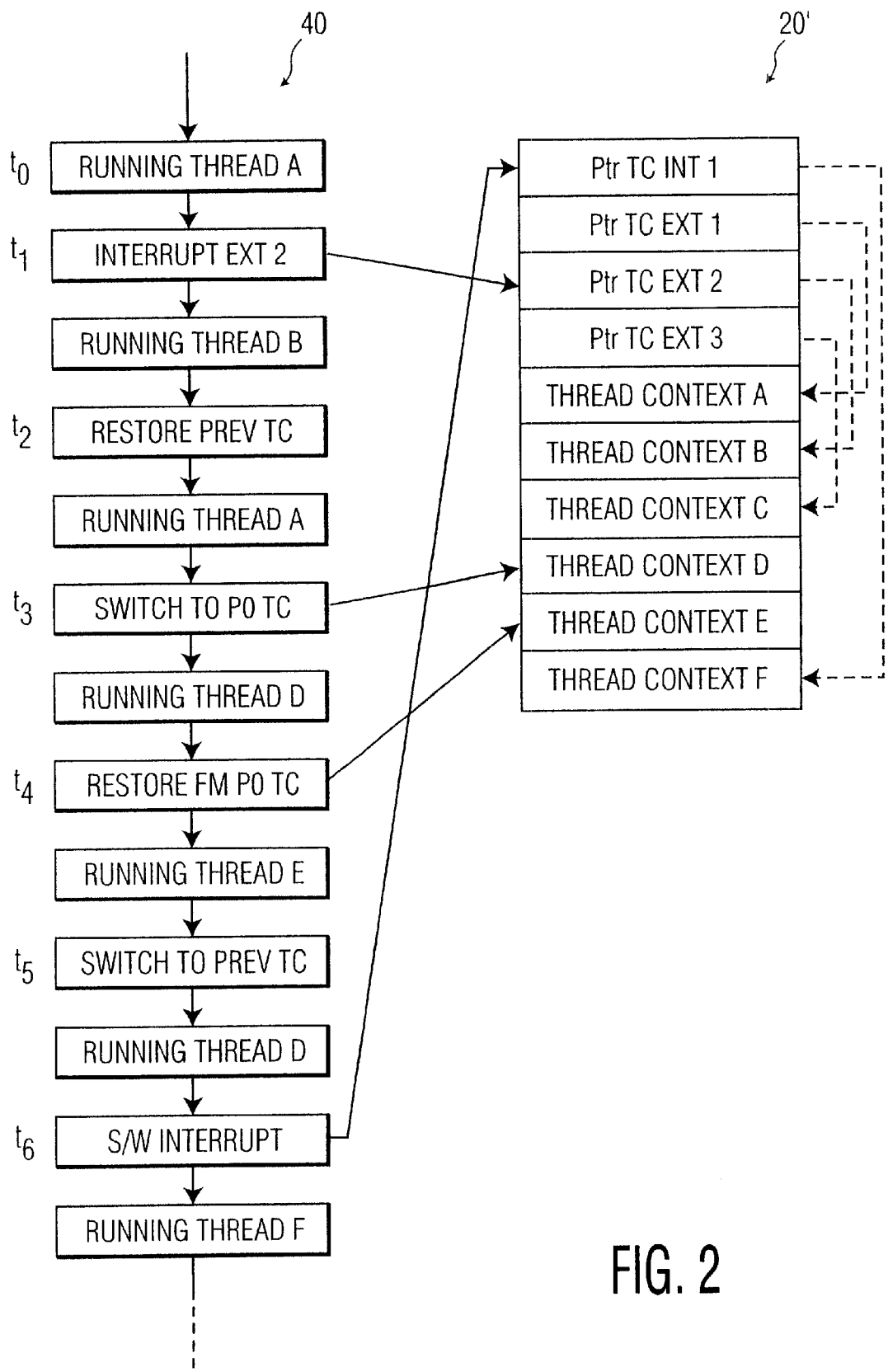
FIG. 2 is a diagram which illustrates operation of the multiple-thread processing system of FIG. 1 with a specific set of pointers and thread contexts stored in memory.

FIG. 2 illustrates operation of the processor 10 under the control of a plurality of exemplary interrupts and instructions for context changes, occurring sequentially. The boxes 40 represent the sequence of events within the processor as these interrupts and context-change instructions occur. The exemplary context-change instructions represented (RESTORE PREV TC, SWITCH TO P0 TC, RESTORE FM P0 TC, SWITCH TO PREV TC and S/W INTERRUPT) effect changes in the context register set 14, as will be explained in detail.

The boxes 20' represent the locations in the memory 20 containing specific pointers, thread contexts located by these pointers, and thread contexts located by the context-change instructions SWITCH TO P0 TC and RESTORE FM P0 TC occurring in the sequence 40. In this specific example, the memory locations 20' contain, respectively:

the pointer Ptr TC INT 1 which is read by the processor in response to interrupt INT 1 and which comprises the memory location of an associated thread context THREAD CONTEXT F;

the pointer Ptr TC EXT 1 which is read by the processor in response to interrupt EXT 1 and which comprises the memory location of an associated thread context THREAD CONTEXT A;

the pointer Ptr TC EXT 2 which is read by the processor in response to interrupt EXT 2 and which comprises the memory location of an associated thread context THREAD CONTEXT B;

the pointer Ptr TC EXT 3 which is read by the processor in response to interrupt EXT 3 and which comprises the memory location of an associated thread context THREAD CONTEXT C;

the thread context THREAD CONTEXT A;

the thread context THREAD CONTEXT B;

the thread context THREAD CONTEXT C;

the thread context THREAD CONTEXT D;

the thread context THREAD CONTEXT E;

the thread context THREAD CONTEXT F.

In this embodiment, the instructions RESTORE PREV TC, SWITCH TO P0 TC, RESTORE FM P0 TC, SWITCH TO PREV TC and S/W INTERRUPT are contained in the memory 20 and are read into the instruction decoder 16 whenever their memory locations are identified by the program counter register PC.

The sequence shown in FIG. 2 begins at a time to, when the processor 10 is running a thread A represented by THREAD CONTEXT A that is contained in the context register set. For purposes of simplicity, it will be presumed that each of the interrupts is enabled and will be executed immediately upon its occurrence.

At time $t_1$ the processor 10 receives over one of the interrupt lines in bus 30 the external interrupt EXT 2. In response to this interrupt the processor:

reads the thread context currently contained in the context register set 14, i.e. the context for thread A (THREAD CONTEXT A), into the memory location identified by the current thread context address contained in the PTR TC register in the context register set 14;

reads into the register PREV PTR TC the address currently contained in the register PTR TC;

causes the thread context locator 120 to produce the address identifying the memory location associated with external interrupt EXT 2, i.e. the memory location where pointer Ptr TC EXT 2 is stored;

reads the pointer Ptr TC EXT 2, identifying the memory location of THREAD CONTEXT B, into the pointer register 122;

reads this thread context into the context register set 14 and begins running thread B.

At time $t_2$, the processor 10 encounters, as the last instruction in thread B, the instruction RESTORE PREV TC. In executing this instruction the processor:

reads the address from the PREV PTR TC register into the pointer register 122;

optionally reads the address from the PTR TC register into the PREV PTR TC register;

reads thread context A from the memory 20' location identified by pointer register 122 into the context register set 14 and re-institutes running of thread A.

At time $t_3$, while running thread A, the processor reads the instruction SWITCH TO P0 TC from a respective location in the memory 20' identified by the program counter register PC. This instruction is provided to enable a switch from one thread to another which may not be identified by any of the pre-stored thread context pointers Ptr TC EXT 1, Ptr TC EXT 2 or Ptr TC EXT 3 in the memory 20'. To facilitate this switch, one of the instructions which precedes the SWITCH TO P0 TC instruction will pre-store in the P0 register, in the context register set, the address identifying the location of the context for the thread to be switched to. In this example, the switch will be from current thread A to a thread D located somewhere in the memory 20'. In execution of this instruction the processor:

reads THREAD CONTEXT A into the memory location identified by the current thread context address contained in register PTR TC in the context register set 14;

reads into the register PREV PTR TC the address currently contained in the register PTR TC;

reads the address from the P0 register into the pointer register 122;

reads the thread context (THREAD CONTEXT D) from the location in the memory 20' identified by the pointer register 122 into the context register set 14;

begins running thread D.

At time $t_4$, in response to instructions read from the memory 20' in the running of thread D, the processor 10 executes the instruction RESTORE FM P0 TC by reading it from the respective location in the memory 20'. The instruction RESTORE FM P0 TC is similar to the instruction SWITCH TO P0 TC, but reads the context of a thread without storing the context currently in the context register set 14. To facilitate performance of this instruction, one of the instructions which precedes the RESTORE FM P0 TC instruction will pre-store in the P0 register the address identifying the location of the context for the thread to be restored. In this example, the processor will restore a thread E by:

reading the address for THREAD CONTEXT E from the P0 register to the pointer register;

optionally reading the address from the PTR TC register into the PREV PTR TC register;

reading THREAD CONTEXT E from memory 20' into the context register set.

At time $t_5$, in the running of thread E, the processor reads the instruction SWITCH TO PREV TC from the respective location in the memory 20' identified by the program counter register PC. This instruction is provided to enable a switch from a currently running thread to the one that was previously running. In this example, the switch will be from current thread E to thread D. In executing this instruction, the processor:

reads THREAD CONTEXT E into the memory location in memory 20' identified by the current thread context address contained in register PTR TC in the context register set 14;

reads the address from the PREV PTR TC register into the pointer register 122;

reads into the register PREV PTR TC the address currently contained in the register PTR TC;

reads thread context F from the memory 20' location identified by pointer register 122 into the context register set 14 and reinstitutes running of thread D.

At time $t_6$, while running thread D, the processor reads the instruction S/W INTERRUPT from the respective location in memory 20' identified by program counter register PC. This instruction is provided to enable a software emulation of a hardware interrupt. In this example, the instruction will emulate interrupt INT 1. In response to this instruction the processor will respond the same way as it would upon receiving a hardware interrupt INT 1. That is, the processor:

reads currently running THREAD CONTEXT D from context register set 14 into the memory location identified by the address contained in register PTR TC;

reads into register PREV PTR TC the address currently contained in register PTR TC;

causes thread context locator 120 to produce the address identifying the memory location associated with internal interrupt INT 1, i.e. the memory location where pointer Ptr TC INT 1 is stored;

reads the pointer Ptr TC INT 1, identifying the memory location of THREAD CONTEXT F, into pointer register 122;

reads this thread context into context register set 14 and begins running thread F.

As thus far described, the processor has the capability of rapidly changing the context contained in a single context register set 14. Preferably, however, to increase context changing speed the processor has a plurality of context register sets. In such case, the optional context cache manager 124 will be included in the processor.

To achieve maximum speed, there would be as many context register sets in the cache as there are different threads to be run by the processor. This would be an inefficient use of cache memory space, however, where such high speed is not needed for every thread. In accordance with another feature of the invention, optimum efficiency is achieved by having fewer context register sets than threads, but by making more register sets per thread available for higher priority threads than for lower priority threads. FIGS. 3 and 4 illustrates two examples of such prioritizing.

FIG. 3 represents thread processing in a system configured to run eight threads (threads A, B, . . . H) by utilizing four context register sets (I,II,III,IV) which are located in a cache memory and are under the control of cache manager 124. Each of the context register sets is similar to that shown in FIG. 1, but further includes a register for storing a Priority Code p which is included in the context of each of the eight threads. In this example:

a single bit will be utilized to indicate either a high priority (p=1) or a low priority (p=0) thread;

threads A,B,C are designated high priority threads;

threads D,E,F,G,H are designated low priority threads.

In the example of FIG. 3, at a time $t_0$ the processor 10 is not running any threads and the context register sets I,II,III, IV are in a reset state in which not one of these register sets contains a thread context. The processor sits idle until it is interrupted as follows:

At time $t_1$, the interrupt EXT 2 is received over bus 30. The processor (via thread context locator 120) reads the pointer Ptr TC EXT 2 into pointer register 122 and then reads, from the memory location identified by this pointer, THREAD CONTEXT B. The cache manager 124 determines that this thread context includes the high Priority Code p=1, that all four of the context register sets are free (i.e. do not contain any context), and routes THREAD CONTEXT B to context register set I. (In this example the cache manager always numerically selects the first free register set, but this could be done in any sequence, including randomly.) Context register set I now becomes active and is continually updated as the processor runs thread B.

At time $t_2$, the interrupt INT 1 is received from a timer within the processor. The processor reads the pointer Ptr TC INT 1 into pointer register 122 and then reads, from the memory location identified by this pointer, THREAD CONTEXT F. The cache manager determines that this thread context includes the low Priority Code p=0, that none of the context register sets contain any low priority context, that context register sets II,III,IV are free, and routes THREAD CONTEXT F to register set II. (Alternatively, a specific one of the context register sets could be reserved for low priority thread contexts. This would eliminate the step of determining that none of the context register sets contain any low priority thread context.) Context register set II becomes active and the processor begins running thread F.

At time $t_3$, the interrupt EXT 1 is received over bus 30. The processor reads the pointer Ptr TC EXT 1 into pointer register 122 and then reads, from the memory location identified by this pointer, THREAD CONTEXT A. The cache manager 124 determines that this thread context includes the high Priority Code p=1, that context register sets III and IV are free, and routes THREAD CONTEXT A to context register set III. This register set becomes active and the processor begins running thread A.

At time $t_4$, while running thread A, the processor reads the instruction SWITCH TO P0 TC from a respective location in the memory 20' identified by the program counter register PC currently in context register set III. (In this example, the address for the memory location of THREAD CONTEXT G will be pre-stored in the P0 register of context register set III. Additionally the Priority Code p=0, which is contained within thread G, enables the cache manager to determine that this thread context should be read into context register set II.) In execution of this instruction the processor will, as in the case where only a single context register set exists:

read THREAD CONTEXT F into the memory location identified by the current thread context address contained in register PTR TC in the context register set II;

read into the register PREV PTR TC the address currently contained in the register PTR TC of context register set III;

read the address of THREAD CONTEXT G from the P0 register of context register set III into the pointer register 122;

read THREAD CONTEXT G into context register set II. Register set II now becomes active and the processor begins running thread G.

At time $t_5$, the interrupt EXT 3 is received over bus 30. The processor reads the pointer Ptr TC EXT 3 into pointer register 122 and then reads, from the memory location identified by this pointer, THREAD CONTEXT C. The cache manager 124 determines that this thread context includes the high Priority Code p=1, that only context register set IV is free, and routes THREAD CONTEXT C to context register set IV. This register set becomes active and the processor begins running thread C.

From this time on, each of thread contexts A,B,C will remain in respective context register sets III,I,IV and each of these threads can be run by simply making the respective register set active. Running of any of threads D,E,F,G,H will require loading of the respective thread context into context register set II.

Thus in a system configured to operate with at least as many dedicated high priority context register sets as there are high priority threads (e.g. in that represented by FIG. 3), once these register sets are loaded with the respective contexts there is never any need to again transfer contexts between them and the memory 20. Thus the delays associated with such transfers are avoided. Conversely, if only a single context register set is provided for the low priority threads, the contexts for these threads must be transferred to the single register set every time the processor changes to a different one of them.

FIG. 4 represents an example of thread processing in an alternative system configuration which operates with two levels of priority. At the first level, as in the FIG. 3 example, more register sets per thread are made available for higher priority threads than for lower priority threads. At the second level of priority, an overflow priority algorithm is utilized for each thread Priority Code p having a plurality of dedicated context register sets, but where the number of these register sets is smaller than the number of threads having the respective priority code p. In this example, again:

a single bit will be utilized to indicate either a high priority (p=1) or a low priority (p=0) thread; but now threads A,B,C and D are designated high priority (i.e. p=1);

an additional pointer Ptr TC EXT 4 which is read by the processor in response to an interrupt EXT 4 and which comprises the memory location of THREAD CONTEXT D is stored in the memory 20'; and threads E,F,G,H are designated low priority (i.e. p=0).

In the example of FIG. 4, from the time to through the time $t_5$, operation is identical to that described for FIG. 3. After that, however, because there are fewer high priority context register sets than there are high priority threads the second level, a second level priority algorithm comes into effect. For example, if the high priority threads are of unequal priorities relative to each other, the second-level priority algorithm may be based on such relative priorities. Alternatively, if they are all of equal priority a different algorithm may be utilized. The following algorithm is based on the history of past utilization of the processor by the high priority threads:

At time $t_6$, the interrupt EXT 4 is received over bus 30. The processor reads the pointer Ptr TC EXT 4 into pointer register 122 and then reads, from the memory location identified by this pointer, THREAD CONTEXT D. The cache manager 124 determines that this thread context includes the high Priority Code p=1, but that no context register sets are free. The cache manager has the capability of tracking the history of requests for use of the cache memory for each of the threads. In a preferred embodiment, this is done by providing a separate counter for each thread, initially resetting all of these counters to zero and then, each time a request is made:

resetting to zero only the counter associated with the thread for which the request is made; and incrementing the counters for the other threads.

From the history stored in these counters, the cache manager determines that the least recent request was for thread B (which occurred at time $t_1$ when the interrupt EXT 2 was received and THREAD CONTEXT B was read into context register set I). Based on this history, the processor reads THREAD CONTEXT B into the memory 20' and then reads THREAD CONTEXT D from memory 20' into context register set I. This register set now becomes active and the processor begins running thread D.

Note that the provision of multiple context register sets enables the processor to sequentially process a number of threads without accessing the memory 20. The time needed for each thread change is measured in clock cycles, rather than the much longer times needed to access a memory via even the fastest bus.

What is claimed is:

1. A method of operating a single processor to selectively run any of a plurality of different threads in response to the reading of a respective thread context into a context register set, said method comprising:

a. associating each of a plurality of interrupts with a respective memory location;

b. storing in the memory locations a plurality of respective thread context pointers, each of said pointers identifying a memory location for containing a thread context fully describing the operational status of one of said threads;

c. in response to the occurrence of any of the interrupts, reading the pointer from the respective memory location associated with said interrupt;

d. from the memory location identified by said thread context pointer, reading the respective thread context into the context register set; and e. running the thread described by the thread context read.

2. A method as in claim 1 where each of the thread context pointers identifies a different memory location.

3. A method as in claim 1 where more than one of the thread context pointers identifies the same memory location.

4. A method as in claim 1 where the processor changes the thread that it is running in response to either one of the interrupts or one of a plurality of thread change instructions in a program stream being executed by the processor.

5. A method as in claim 4 where the thread change instructions include a SWITCH instruction for saving the context of a currently running thread and changing the thread being run to a different thread.

6. A method as in claim 5 where the processor stores the address of a context for a previously run thread and where said thread change instructions include a first SWITCH instruction for changing the thread being run to said previously run thread.

7. A method as in claim 5 including a second SWITCH instruction for changing the thread being run to one having its context contained in a memory location which is identified by the second SWITCH instruction.

8. A method as in claim 7 where the second SWITCH instruction implicitly identifies the memory location of said context.

9. A method as in claim 7 where the second SWITCH instruction explicitly identifies the memory location of said context.

10. A method as in claim 9 where the second SWITCH instruction contains a pointer identifying the memory location of said context.

11. A method as in claim 9 where the second SWITCH instruction identifies a memory location containing a pointer identifying the memory location of said context.

12. A method as in claim 4 where the thread change instructions include a RESTORE instruction for, without saving the context of a currently running thread, running a different thread.

13. A method as in claim 12 where the processor stores the address of a context for a previously run thread and where said thread change instructions include a first RESTORE instruction for changing the thread being run to said previously run thread.

14. A method as in claim 12 including a second RESTORE instruction for changing the thread being run to one having its context contained in a memory location which is identified by the second RESTORE instruction.

15. A method as in claim 14 where the second RESTORE instruction implicitly identifies the memory location of said context.

16. A method as in claim 14 where the second RESTORE instruction explicitly identifies the memory location of said context.

17. A method as in claim 16 where the second RESTORE instruction contains a pointer identifying the memory location of said context.

18. A method as in claim 16 where the second RESTORE instruction identifies a memory location containing a pointer identifying the memory location of said context.

19. A method as in claim 4 where the thread change instructions include a S/W INTERRUPT instruction for emulating an interrupt.

20. A method as in claim 4 where a plurality of context register sets are provided, said single processor running the thread contained in a predetermined one of said context register sets.

21. A method as in claim 1 where the context register set includes:

a. a register for storing the memory address of the context for the thread currently being run by the processor;

b. a register which is used for identifying the locations of thread contexts that are not identified by the thread context pointers.

22. A method as in claim 1 where the context register set includes a register for storing the memory address of the context for a thread previously run by the processor.

23. A method as in claim 1 where the processor includes a plurality of context register sets.

24. A method as in claim 23 where the number of context register sets is smaller than the number of threads to be run by the processor.

25. A method as in claim 24 where an algorithm based on priorities is employed for selecting which of the context register sets the thread contexts are read into.

26. A method as in claim 24 where the threads include higher priority threads and lower priority threads and a proportionately larger number of the context register sets is made available for the higher priority threads than for the lower priority threads.

27. A method as in claim 26 where the priority of at least one of the threads is changeable during operation of the processor.

28. A method as in claim 26 where a set selection algorithm is employed when, at the time of reading a thread context for one of the higher or lower priority threads, all of the context register sets made available for the respective priority already contain contexts for threads other than the one being read.

29. A method as in claim 28 where said algorithm effects reading said thread context into an available one of the context register sets which contains a least recently stored thread context.

30. A method of operating a network of processors such that each of said processors selectively runs any of a plurality of different threads in response to the reading of a respective thread context into a context register set, said method comprising:

a. associating each of a plurality of interrupts with a respective memory location;

b. storing in the memory locations a plurality of respective thread context pointers, each of said pointers identifying a memory location for containing a thread context fully describing the operational status of one of said threads;

c. in response to the occurrence of any of the interrupts, reading the pointer from the respective memory location associated with said interrupt;

d. from the memory location identified by said thread context pointer, reading the respective thread context into the context register set; and e. running the thread described by the thread context read.

31. A method as in claim 30 where at least one of the threads is a common thread that may be run by more than one of the processors.

* * * * *